Patented July 22, 1924.

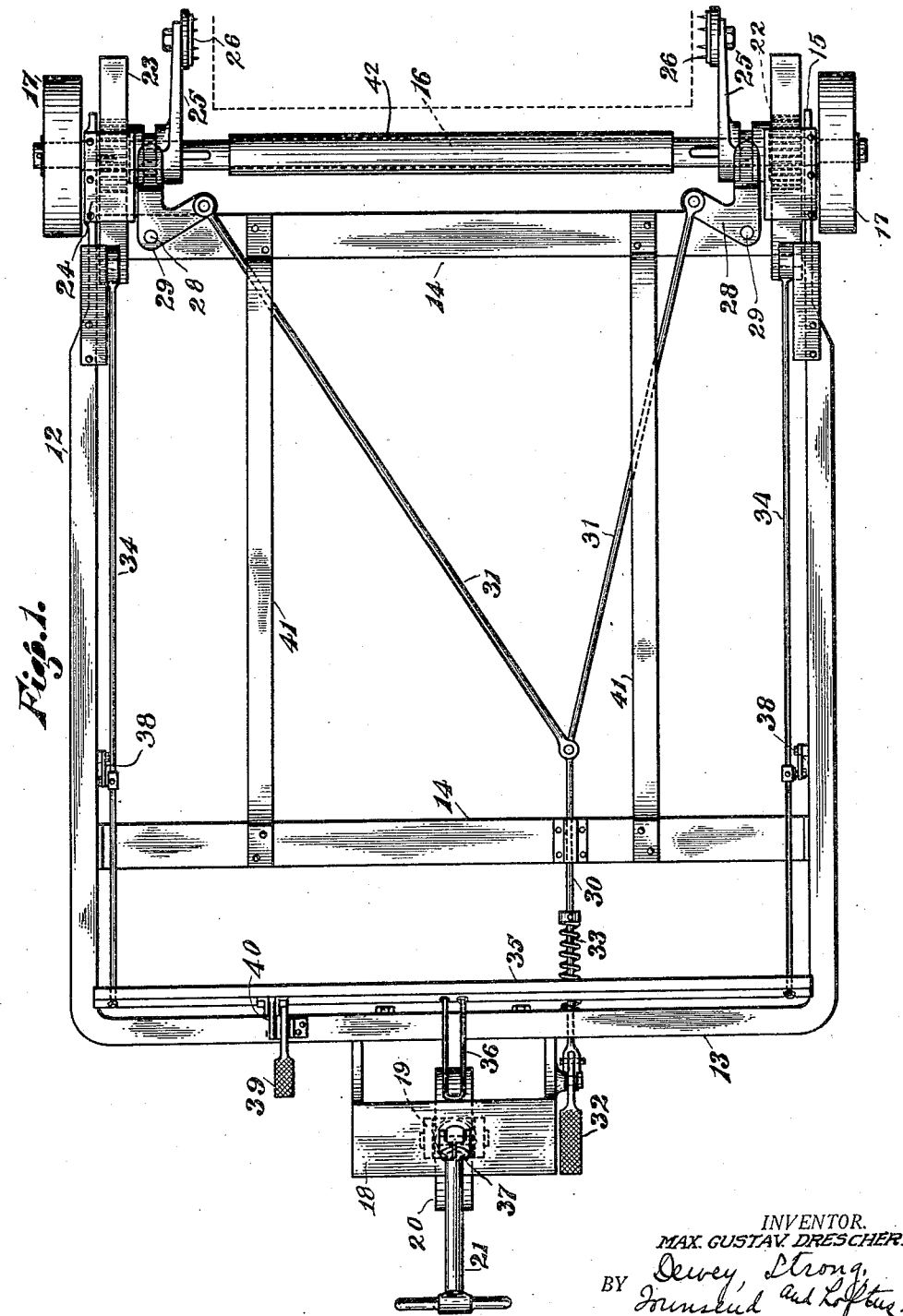

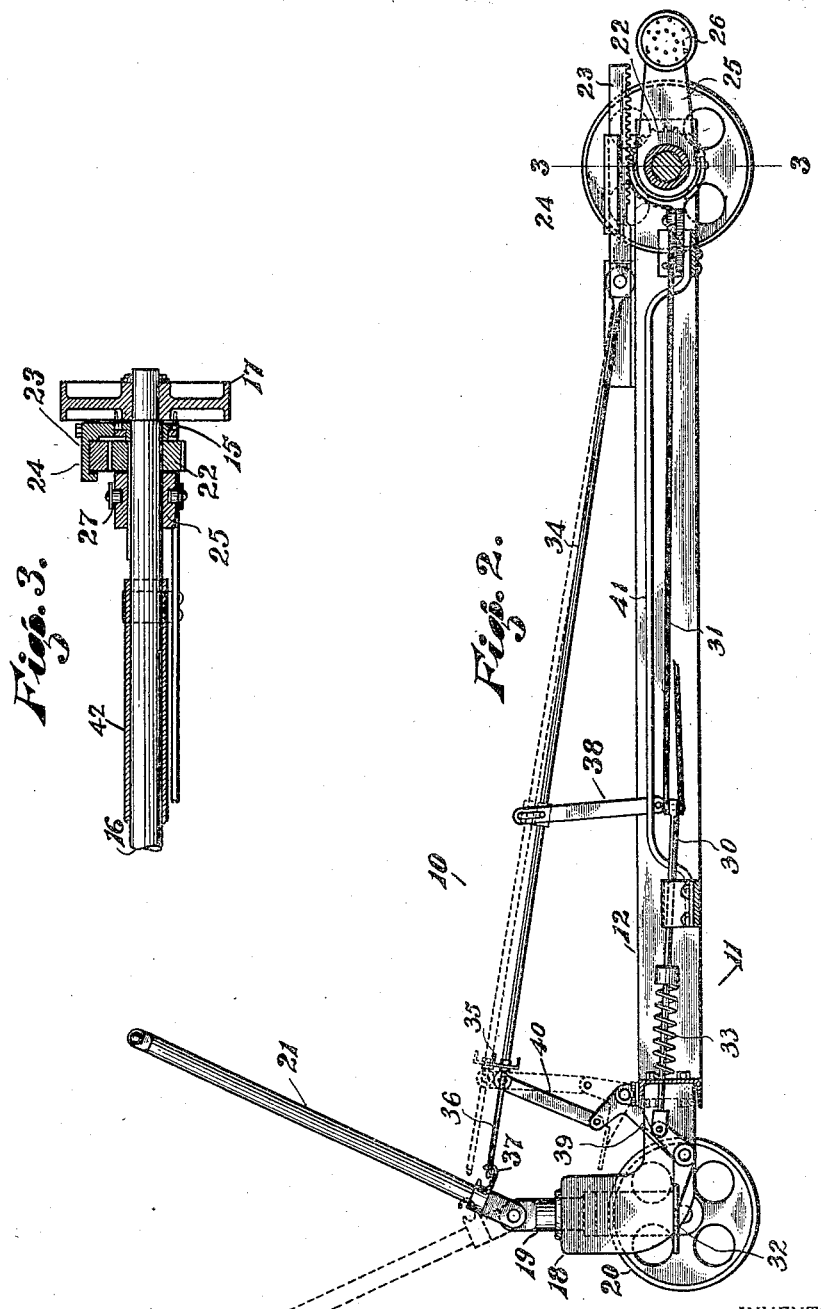

1,502,237

UNITED STATES PATENT OFFICE.

MAX GUSTAV DRESCHER, OF SAN FRANCISCO, CALIFORNIA.

TRUCK.

Application filed February 26, 1923. Serial No. 621,160.

*To all whom it may concern:*

Be it known that I, MAX GUSTAV DRESCHER, a citizen of the United States, residing at the city and county of San Francisco and State of California, have invented new and useful Improvements in Trucks, of which the following is a specification.

This invention relates to trucks, especially to those adapted for use in warehouses and manufacturing establishments for handling and transporting heavy articles.

It is the principal object of the present invention to provide a generally improved truck which is particularly adapted for use in handling and transporting heavy packages, and which is equipped with mechanism that may be operated to elevate and place an article to be transported onto the truck and to remove the article therefrom when desired.

The invention contemplates the use of a truck frame having a running gear and a pair of co-operating gripper members which may be operated when the truck is positioned adjacent the article to be transported to firmly grip the article and place it on the truck frame. The gripper members mentioned may also be operated to remove the article from the truck.

One form which the invention may assume is exemplified in the following description and illustrated by way of example in the accompanying drawings, in which:—

Fig. 1 is a plan view of a truck embodying the present invention.

Fig. 2 is a side elevation of the same.

Fig. 3 is a fragmentary section view taken on line 3—3 of Fig. 1 in the direction of the arrows.

Referring more particularly to the accompanying drawings, 10 indicates a truck having a frame 11. The frame is formed of side frames 12 and a front member 13. The side members are rigidly connected by transverse frame bars 14. The rear ends of the side frames 12 are fitted with bearings 15 for the reception of an axle 16. Wheels 17 are turnably mounted at the ends of this axle.

The front frame member 13 is fitted with a bracket 18 which turnably supports a yoke 19. A wheel 20 is mounted at the lower end of the yoke. The upper end of the yoke is pivotally connected to a handle bar 21. As the member 19 is turnably supported in the bracket 18, the handle bar 21 may be employed to draw and steer the truck.

Adjacent each wheel, the axle is fitted with pinions 22. These pinions are keyed on the shaft and are in constant mesh with the teeth on rack bars 23. The latter are guided for horizontal reciprocating movement in guides 24 secured on the frame.

Feathered on the axle intermediate the pinions 22, is a pair of co-operating gripper arms 25. The outer ends of these arms are fitted with spiked disks 26. The hub portion of the arms is grooved to receive the pins 27 of bell crank shifting yokes 28. These yokes are pivoted to the transverse frame bars 14 as at 29. It is intended that the shifting yokes be operated to shift the gripper arms 25 toward each other, to engage the spiked surfaces of the disks with the opposite sides of an article to be conveyed. For this purpose, one end of each of the bell crank shifting yokes is connected to a reciprocal control rod 30 by connecting rods 31. The control rod 30 may be operated by manipulating a pivoted foot pedal 32. When this pedal is depressed, the bell crank shifting levers are caused to move the gripper arms toward each other. When the pedal is released, a spring 33 returns the mechanism to normal position.

It is intended to raise an article gripped by the gripper arms and to shift it forwardly onto the truck. This is accomplished through the medium of the pinions 22 and the racks 23, previously mentioned. The pinions being keyed and the gripper arms feathered on the shaft, it is seen that when the pinions are rotated they will revolve the axle and consequently swing the arms. To accomplish this, the front end of the racks 23 pivotally connects to the ends of reach rods 34, the front ends of which are connected by a cross bar 35. This bar is fitted with a latch 36 which may be engaged by hook 37 on the handle bar 21. When these elements are engaged, the handle may be oscillated to reciprocate the racks 23 and impart turning movement to the pinions 22. When the handle bar is drawn forwardly the racks will act through the pinions and axle to swing the arms upwardly and forwardly. When the handle bar is moved in the opposite direction the arms will be returned to normal position.

The reach rods 34 and the cross bar 35 are maintained slightly elevated from the frame of the track and the latch thereon is held from engagement with the hook on the handle bar. The members are supported in this position by side links 38. The crossbar may be raised so that the latch 36 may be engaged by the hook 37 by manipulating a foot pedal 39 connected by a toggle mechanism 40 to the crossbar. When this foot pedal is raised, it raises the crossbar to an operative position.

The transverse frame bars are fitted with upraised rigid skids 41 upon which articles placed on the truck will bear.

In operation of the device, the truck is backed up so as to dispose an object to be conveyed between the gripper arms. The pedal 39 is then raised to elevate the latch 36 which may then be engaged by the hook 37 on the handle bar 21. When this is accomplished, the foot pedal 32 may be depressed to shift the gripper arms so that the disks thereon will firmly engage the sides of the object. This engagement is held until the handle bar is drawn forwardly to swing the arms 25 upwardly and forwardly. This will raise the end of the object and shift it onto a roller 42 on the axle. The arms may then be permitted to return to normal position and the operation repeated until the object is firmly seated on the members or skids 41.

In removing the object from the truck, the operation just described is reversed. That is, the arms 25 are swung upwardly first and then shifted inwardly to grip the object. The handle bar is then shifted rearwardly to swing the arms rearwardly and downwardly to remove the object from the skids.

From the foregoing, it is obvious that a mechanism described forms a very desirable truck which is particularly adapted for handling bulky objects of great weight. Also that with the use of this truck, a single person can attend to conveying heavy articles from place to place, where ordinarily two or more persons would be required.

While I have shown the preferred form of my invention, it is understood that various changes in the design and construction of the device may be made without departing from the spirit of the invention as defined in the appended claims.

Having thus described my invention, what I claim and desire to secure by Letters Patent is:—

1. A truck comprising a frame having a running gear, a pair of gripper members arranged on the frame, operative means for moving said members toward and away from each other whereby they may be caused to grip the opposite sides of an object, and other means for swinging said arms whereby they may be caused to shift an object gripped onto or off the frame.

2. A truck comprising a frame, having front and rear supporting wheels, a rear axle supporting the rear wheels, gripper members on said axle, means for shifting said members toward and away from each other whereby they may be caused to grip the opposite sides of an object, and means for swinging said arms upwardly and forwardly to raise an object gripped and shift it onto the frame.

3. A truck comprising a frame having front and rear supporting wheels, an axle carrying the rear wheels, gripper arms on said axle, means at the front of the frame for shifting said arms toward and away from each other, and operative means at the front of the frame for swinging said arms.

4. A truck comprising a frame having front and rear supporting wheels, an axle carrying the rear wheels, a pair of gripper arms mounted adjacent each end of the axle, operative means at the front of the frame for shifting said arms toward and away from each other, and means for swinging said arms in unison when either in or out of gripping position.

5. A truck comprising a frame having front and rear wheels, an axle journalled at the rear of the frame and carrying the rear wheels, a pair of gripper arms feathered on the axle and disposed one adjacent each end thereof, a foot pedal at the front of the frame operatively connected to said arms for shifting the same toward and away from each other, and operative means for rotating said axle to cause said arms to swing in unison.

6. A truck comprising a frame having front and rear wheels, an axle journalled at the rear of the frame and carrying the rear wheels, a pair of gripper arms feathered on the axle and disposed one adjacent each end thereof, a foot pedal at the front of the frame and operatively connected to said arms for shifting the same toward and away from each other, and operative means for rotating said axle to cause said arms to swing in unison, and means for rendering the last mentioned means inoperative.

7. A truck comprising a frame having front and rear supporting wheels, an axle carrying the rear wheels, a pair of gripper arms feathered on the axle, a foot pedal at the front of the frame and operable to shift said arms toward and away from each other, pinions fixed on the axle, racks in mesh therewith, and means for reciprocating said racks to rotate the axle and swing said arms.

8. A truck comprising a frame including side bars and a front bar, a transverse axle journaled at the ends of said side bars of the frame, wheels freely rotatable at the ends of said axle, a pair of rearwardly projecting gripper arms feathered on said axle and disposed one adjacent each end thereof, a foot pedal pivotally mounted at the front of the frame, bell crank levers mounted at the rear of the frame and operatively engaging said gripper arm, connections between said bell cranks and said foot pedal whereby the latter may be manipulated to shift said gripper arms toward and away from each other, pinions fixed one adjacent each end of the axle, racks associated with said pinions and guided for movement longitudinally of the frame and in constant mesh with said pinions, a pair of reach rods pivotally connected to said racks and extending to a point adjacent the front of the frame, a transverse member connecting said reach rods, a pivotal member at the front of the frame adapted to be operatively connected to said transverse member for reciprocating said reach rods and thereby imparting turning movement to said pinions and the axle for swinging said gripper arms.

MAX GUSTAV DRESCHER.